United States Patent [19]
Balk

[11] 3,968,287
[45] July 6, 1976

[54] BONDED SLIT FOILS

[75] Inventor: Hermann Balk, Kriegsdorf, Germany

[73] Assignee: Reifenhauser KG, Troisdorf, Germany

[22] Filed: Aug. 12, 1974

[21] Appl. No.: 496,742

[30] Foreign Application Priority Data

Aug. 10, 1973 Germany............................ 2340545

[52] U.S. Cl................................. 428/136; 156/257; 156/263; 156/264; 156/291; 210/500 R; 428/137; 428/198; 428/201; 428/203; 428/212; 428/213

[51] Int. Cl.$^{2}$........................ B32B 3/10; B32B 7/14; B32B 27/06; B32B 31/12

[58] Field of Search ........... 156/229, 257, 263, 264; 161/117, 164, 146, 148; 428/136, 137, 195, 198, 201

[56] References Cited

UNITED STATES PATENTS

| | | | |
|---|---|---|---|
| 3,328,227 | 6/1967 | Moseley et al. | 161/117 |
| 3,454,455 | 7/1969 | Rasmussen | 428/136 |
| 3,496,059 | 2/1970 | Rasmussen | 428/516 |
| 3,764,450 | 10/1973 | Tesch | 428/474 |
| 3,806,390 | 4/1974 | Balk et al. | 156/229 |

*Primary Examiner*—J.C. Cannon
*Attorney, Agent, or Firm*—Karl F. Ross; Herbert Dubno

[57] ABSTRACT

A composite foil or laminate of two synthetic-resin foils having mutually transverse main stretch directions (orientations) is formed by bonding the foils together after they have been incised in rows of spaced-apart incisions extending in the main stretch direction of each foil. Successive alternating rows along the foil have incisions offset along the rows from one another.

1 Claim, 6 Drawing Figures

FIG. 3
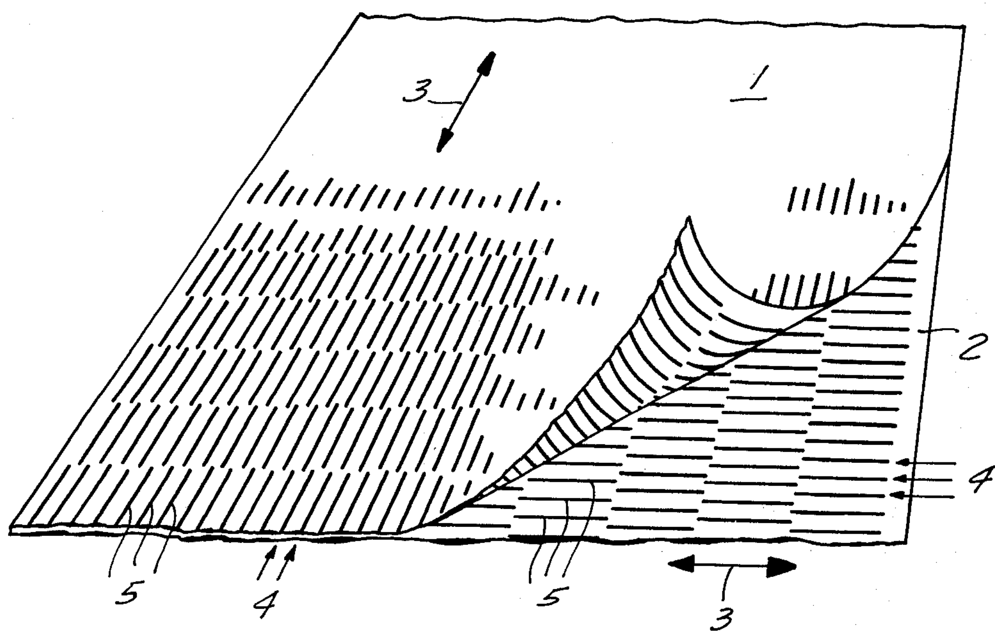
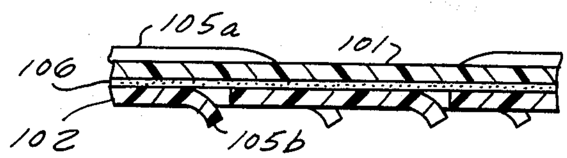
FIG. 4
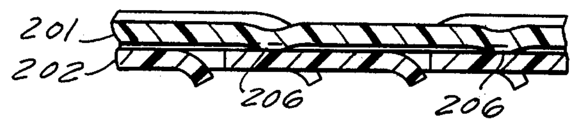
FIG. 5
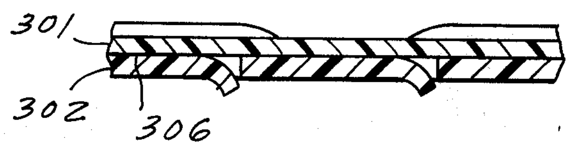
FIG. 6

BONDED SLIT FOILS

FIELD OF THE INVENTION

The present invention relates to composite or laminated foils structures and, more particularly, to an improved composite foil consisting of a stack of two or more foils bonded together to form a unit and offering textural and utilitarian advantages over prior-art foils of the bonded type.

BACKGROUND OF THE INVENTION

In my prior U.S. Pat. No. 3,806,390 there is described a system for incising a synthetic resin foil and stretching or shrinking this foil to deflect the edges of the incision out of the normal foil plane whereby the foil is textured and has a fabric-like character in which strips of the foil material correspond to the filaments of a weave. The foil is suitable as a cushioning material for packing and many other purposes in which the bulk weight of the foil is low for a given actual weight.

It is also known in the art of fabricating foils to increase the strength of a foil web by laminating two or more foils together concurrently with or after imparting uniaxial or biaxial strength to the foils by stretching. More particularly, the last two foils are juxtaposed with main stretch directions (orientations or directions of improved tensile strength) in such manner that the main stretch directions are mutually transverse and preferably cross each other in an orthogonal relationship. The composite web or sheet has biaxial strength and each of the foils or one of them may also be stretched transversely to the main stretch direction although it is preferred to operate with uniaxially stretched foils.

As is well known, the stretching of the primary foils renders their mechanical properties anisotropic.

The laminated or composite foils having mutually transverse uniaxial main stretch directions retain the characteristics, utilities and physical properties of synthetic-resin foils. The laminating operation only increases the strength of the foil and superimposes the desired state of anisotropy upon the mechanical properties as generated by stretching and bonding.

In many instances, foil webs of greater utility than has now been recognized for laminated foils has been desired while it is also recognized that incised foils of the aforedescribed type cannot be employed for many purposes. For example, when a single foil is incised as described and is used as a filter layer, it is readily degraded by the fluid if it has a kinetic energy, abrasive character or high flow rate.

OBJECTS OF THE INVENTION

It is an object of the present invention to provide a laminated foil of greater utility than earlier foil laminates and improved physical properties.

It is another object of the invention to provide an improved fabric-like structure from a synthetic-resin foil which has significantly greater strength than prior-art pseudofabrics of thermoplastic foils.

SUMMARY OF THE INVENTION

From the foregoing discussion it is fully apparent that the art has long sought to provide a thermoplastic web having strength characteristics of composite or laminated uniaxially strengthened foils but without the character of synthetic-resin foils and hence to provide a fabric-like structure of greater strength and low cost. These objects are achieved, in accordance with the present invention, in that a composite of two or more mutually bonded foils having uniaxial stretch directions, but with surface arrays of slits for incisions in rows parallel to the respective main stretch direction are superimposed and bonded together with their main stretch directions running in mutually orthogonal or transverse direction. The primary foils, according to the invention have rows of parallel slits extending, furthermore parallel to the main stretch direction and with the incision slits being longitudinally offset from one another. Preferably, the spacing between successive slits in each row is equal to the length of the slits, all of the slits are of equal length, and the slits of one row are offset from the slits of the neighboring rows by a distance equal to the slit length, although variation may be had in these relationships as indicated below.

Between the superposition of at least two foils having mutually transverse main stretch directions and surface arrays of slits as described, I am able to obtain a pseudofabric with woven-like connection of the strips of synthetic-resin foil defined between slits at the same level. The foil strips thus function as threads which are held together by the regions between the slits so that porosity, stability, bulk density and like characteristics of the composite foil corresponds to those of fabrics composed of synthetic fabrics. The composite foils according to the invention have been found to be especially effective for the production of sacks, for use as cushioning material in packaging, as a base layer in the production of carpetry and for other purposes in which low cost fabrics have been used heretofore.

Moreover, the composite foil has the advantage that it is lighter than many fabrics and has greater strength since the mutually orthogonal bonding of the uniaxialy strip foils affords greater resistance to further tearing in the incisions.

By varying the slit length and slit spacing it is possible to make the composite foil suitable for a variety of purposes. For example, the pseudofabric can be used as a filter cloth with varying degrees of porosity and permeability depending upon the number of foils bonded together the slit length and the slit spacing.

Special optical effects can be obtained when the slits formed by incision of the primary foils are spread open to a greater or lesser extent. When the primary foils are of different color, the optical effect ca be varied correspondingly.

The slit length can vary on a given foil and the foils bonded together may be composed of different materials or may be of different thickness and/or have different degrees of stretch as desired. One or more of the primary foils may be made shrinkable as described to another primary foil.

The primary foil can be bonded together by the use of heat and pressure, especially when they are composed of thermoplastic synthetic-resin materials. Thermoplastic foils may also be bonded by ultrasonic energy and foils of thermoplastic or other material may be bonded with the aid of an adhesive. In all of the cases described the primary foils may be bonded together in surface-binding relationship. However, when it is desired to render the composite foil porous and fluffy, it is advantageous to carry out the bonding at spaced apart points distributed over the juxtaposed surfaces. The latter bonding technique is used when the foil is to have a fabric or sieve-like character. Indeed, the composite foil of the present invention may be used as sieves, filter cloths and the like.

BRIEF DESCRIPTION OF THE DRAWING

The above and other objects, features and advantages of the present invention will become more readily apparent from the following description, reference being made to the accompanying drawing in which:

FIG. 3 is a diagrammatic perspective view of the composite as it is formed; and FIGS. 4 through 6 are cross sections illustrating composites according to different embodiments of the invention.

SPECIFIC DESCRIPTION

Figure 1:
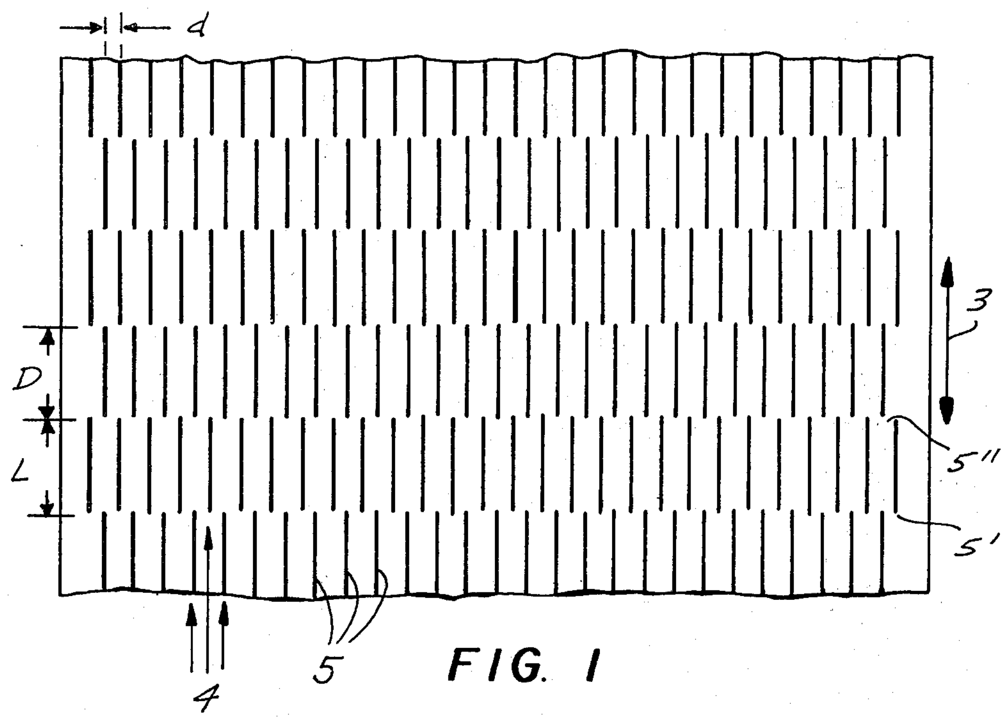
FIG. 1 is a plan view of a primary foil according to the invention.
Figure 2:
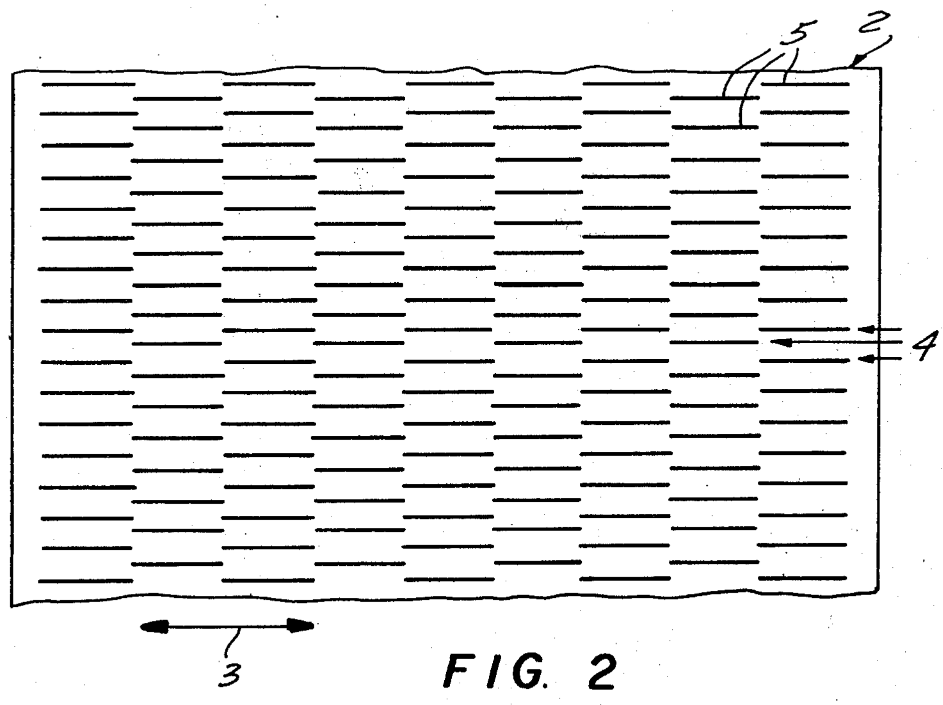
FIG. 2 is a similar view of the other primary foil.

Each of the foils 1 and 2 shown in FIGS. 1 and 2 is composed of a thermoplastic synthetic-resin, e.g. polyethylene, previously stretch and thereby uniaxially oriented in the direction of arrow 3 as is well known in the synthetic-foil art. According to the present invention, each of the foils is provided with a surface area of throughgoing incisions 5 in rows 4 which run parallel to the main stretch direction 3, the slits 5 having lengths L and spacings D along the particular row whereby L equals D. Advantageously, the rows 4 are spaced apart by a distance *d* which is a fraction of the distance L and may be between 0.05L and 0.5L. The alternate rows are, as can be seen from FIGS. 1 and 2, mutually offset in the direction of arrows 3 by the distance L. This means that the leading end 5' of one incision is spaced parallel to the main stretch direction 3 from the corresponding end 5'' of an incision of the next row by the distance L and these ends delineate transverse strips running perpendicular to the main stretch direction. The sheets are bonded together (FIG. 3) with their main stretch direction orthogonal to one another as described, for example, in connection with FIG. 4 and FIG. 1. In FIG. 4 the upper sheet 101, which has its incision edges 105*a* twisted upwardly out of the plane of the foil is surface bonded to the lower foil 102 whose upwardly turned incision edges are seen at 105*b*, by a layer 106 of adhesive. In the embodiment of FIG. 5 the upper foil 201 is bonded to the lower foil 202 at point-like heat seals 206. In FIG. 6, the upper foil 301 is bonded to the lower foil 302 by ultrasonic welding over the entire interface 306.

I claim:

1. A composite foil having a hand and texture approximating that of a fabric and consisting of a laminate of at least two co-extensive synthetic resin foil sheets bonded together under heat and pressure over substantially their entire areas in contact with one another, each of said sheets being provided with a surface array equal length slits in respective parallel rows wherein the slits are spaced apart by a distance substantially less than the slit length, the rows of alternate sheets being mutually transverse and of a width equal to the slit length, the slits of each row being staggered with respect to the slits in neighboring rows such that, except for first and last slits in a row and the slits in first and last rows, each slit of a row of any sheet begins level with the ends of but between two adjacent slits of the next row and ends level with the beginnings of but between two adjacent slits of the opposed next row, said sheets being uniaxially oriented by stretching in the direction of the respective rows whereby the stretch directions of said sheets are mutually transverse.

* * * * *